US010532759B2

(12) United States Patent
Li et al.

(10) Patent No.: US 10,532,759 B2
(45) Date of Patent: Jan. 14, 2020

(54) CHILD SUPPORT APPARATUS

(71) Applicant: Wonderland Switzerland AG, Steinhausen (CH)

(72) Inventors: Jian Qun Li, Guangdong (CN); Haitao Wu, Guangdong (CN); Xiaolong Yi, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/850,245

(22) Filed: Dec. 21, 2017

(65) Prior Publication Data

US 2018/0194384 A1 Jul. 12, 2018

(30) Foreign Application Priority Data

Jan. 6, 2017 (CN) .......................... 2017 1 0010158
Jan. 20, 2017 (CN) .......................... 2017 1 0041957
Nov. 16, 2017 (CN) .......................... 2017 1 1139543

(51) Int. Cl.
*B62B 9/10* (2006.01)
*B62B 9/24* (2006.01)
*A47D 15/00* (2006.01)
*A47D 13/04* (2006.01)

(52) U.S. Cl.
CPC .............. *B62B 9/102* (2013.01); *A47D 13/04* (2013.01); *A47D 15/005* (2013.01); *B62B 9/24* (2013.01)

(58) Field of Classification Search
CPC ......... B62B 9/102; B62B 9/104; B62B 9/108; B62B 9/24; A47D 13/04; A47D 13/043; A47D 15/005; A47D 15/006

USPC .................................................. 280/47.4, 650
See application file for complete search history.

(56) References Cited

U.S. PATENT DOCUMENTS

| 421,284 | A | | 2/1890 | Johnson |
| 453,212 | A | | 6/1891 | Sager |
| 2,545,084 | A | | 3/1951 | Harasty |
| 3,070,814 | A | * | 1/1963 | Withoff ................. A47C 7/30 267/80 |
| 3,235,306 | A | * | 2/1966 | Chernivsky ........... A47D 1/006 297/296 |
| 3,485,507 | A | | 12/1969 | Christof |

(Continued)

FOREIGN PATENT DOCUMENTS

| CH | 374294 A | 12/1963 |
| EP | 0249875 A2 | 12/1987 |

(Continued)

OTHER PUBLICATIONS

Search Report in co-pending EP Appl. No. 17209712 dated Jun. 8, 2018.

(Continued)

*Primary Examiner* — John D Walters
(74) *Attorney, Agent, or Firm* — NZ Carr Law Office, PLLC

(57) ABSTRACT

A child support apparatus includes a standing frame, and a juvenile support assembly supported on the standing frame, wherein the juvenile support assembly has a left and a right side and includes a resilient wire extending between the left and right sides, the resilient wire forming a bearing support for a child that is elastically deformable along an upward-downward direction of the juvenile support assembly.

28 Claims, 17 Drawing Sheets

(56) References Cited

U.S. PATENT DOCUMENTS

| | | | | |
|---|---|---|---|---|
| 4,762,331 | A | * | 8/1988 | Tucker ...................... B62B 7/12 |
| | | | | 280/30 |
| 4,826,196 | A | * | 5/1989 | Kirkpatrick .............. A61G 5/08 |
| | | | | 280/650 |
| 9,027,953 | B2 | * | 5/2015 | Funakura .................. B62B 7/08 |
| | | | | 280/650 |
| 9,855,964 | B2 | * | 1/2018 | Sack .......................... B62B 7/10 |
| 2004/0217643 | A1 | | 11/2004 | Piwko, Jr. et al. |
| 2015/0238024 | A1 | * | 8/2015 | Lucas ...................... A47D 1/00 |
| | | | | 297/181 |

FOREIGN PATENT DOCUMENTS

| | | |
|---|---|---|
| EP | 2965969 A1 | 1/2016 |
| FR | 2670175 A2 | 6/1992 |
| GB | 212988 A | 3/1924 |
| JP | 2003-340773 A | 9/2003 |
| JP | 2005-162050 A | 6/2005 |
| JP | 2016-041200 A | 3/2016 |
| TW | I526355 B | 9/2009 |

OTHER PUBLICATIONS

Office Action issued by the Japan Patent Office dated Apr. 2, 2019 in connection with Japanese patent application No. 2017-244967.
The Office Action in co-pendingTaiwan Patent Application No. 106144973 dated Nov. 8, 2018.

* cited by examiner

CHILD SUPPORT APPARATUS

CROSS-REFERENCE TO RELATED APPLICATION(S)

This patent application respectively claims priority to China Patent Application No. 201710010158.0 filed on Jan. 6, 2017; and to China Patent Application No. 201710041957.4 filed on Jan. 20, 2017; and to China Patent Application No. 201711139543.1 filed on Nov. 16, 2017, all of which are incorporated herein by reference.

BACKGROUND

1. Field of the Invention

The present invention relates to child support apparatuses.

2. Description of the Related Art

Child strollers can be used to conveniently transport babies and children for outdoor activities. Typical design needs for a child stroller may include a frame structure that can be conveniently and safely operated for folding and unfolding, have a compact size in a folded state, and can be adaptable to different configurations of use.

Child strollers available on the market may also have a seat that can be detachably installed and/or converted to different configurations for receiving a child in a sitting position or a sleeping position. During use, the seat needs to provide a comfortable environment for a child. However, the conventional seat construction using a fabric stretched and attached to the frame structure may not be sufficient to satisfy this need.

Therefore, there is a need for an improved design that can provide a comfortable environment for receiving a child during use, and can address at least the foregoing issues.

SUMMARY

The present application describes a child support apparatus that can provide a more comfortable support for a child. The child support apparatus includes a standing frame, and a juvenile support assembly supported on the standing frame, wherein the juvenile support assembly has a left and a right side and includes a resilient wire extending between the left and right sides, the resilient wire forming a bearing support for a child that is elastically deformable along an upward-downward direction of the juvenile support assembly.

Advantages of the child support apparatus described herein include the ability of the resilient wire to deform elastically for dissipating a part of undesirable vibrations and/or shock energy that may be transmitted from the standing frame to the juvenile support assembly during use, thereby providing a more comfortable support for a child.

DETAILED DESCRIPTION OF THE EMBODIMENTS

The present application describes a child support apparatus that includes a standing frame, and a juvenile support assembly supported on the standing frame. The juvenile support assembly has a left and a right side, and includes a resilient wire extending between the left and right sides, the resilient wire forming a bearing support for a child that is elastically deformable along an upward-downward direction of the child support apparatus. The resilient wire can act as a cushion to provide comfortable support for a child. Embodiments of the child support apparatus described herein include child stroller apparatuses. However, it will be appreciated that the juvenile support assembly described herein may be implemented in any types of child support apparatuses, which include, without limitation, child stroller apparatuses, child motion apparatuses such as infant swings or rockers, and the like. Moreover, the juvenile support assembly may be adapted to provide support for a child in different positions, such as a sitting position and/or a recline position.

Figure 1:
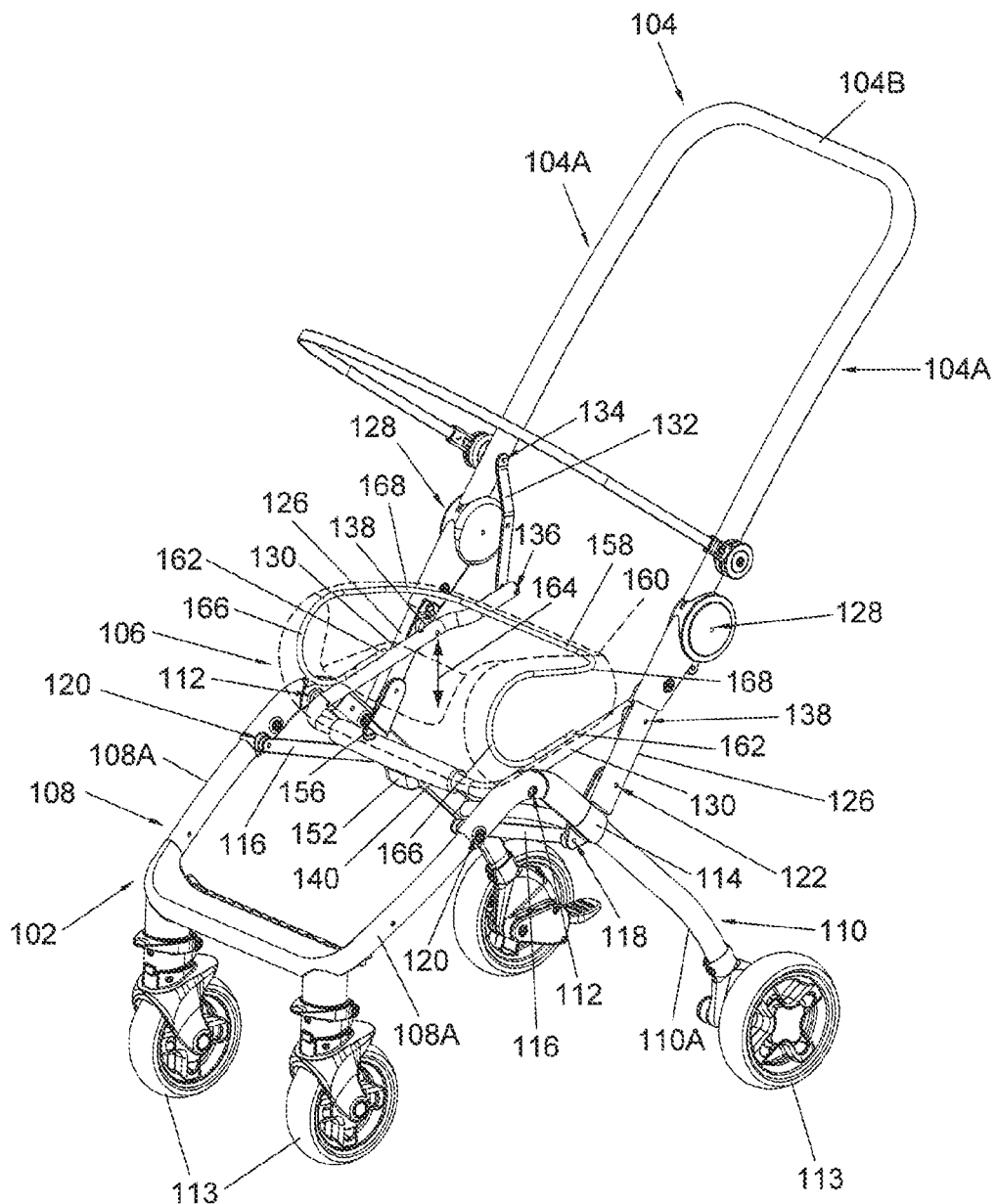
FIG. 1 is a perspective view illustrating an embodiment of a child support apparatus.

FIG. 1 is a perspective view illustrating a child support apparatus 100 implemented as a child stroller apparatus embodiment. The child support apparatus 100 can include a standing frame 102, a handle frame 104 connected with the standing frame 102, and a juvenile support assembly 106 supported on the standing frame 102.

The standing frame 102 can include two leg frames 108 and 110 connected with each other. The leg frame 108 can be exemplary a front leg frame, and the leg frame 110 can be exemplary a rear leg frame. Each of the leg frames 108 and 110 can respectively include two side segments disposed symmetrically at a left and a right side of the standing frame 102, e.g., two side segments 108A for the leg frame 108 and two side segments 110A for the leg frame 110. The two side segments 108A of the leg frame 108 can be respectively coupled pivotally to the two side segments 110A of the leg frame 110, so that the leg frames 108 and 110 can rotate relative to each other during folding and unfolding of the child support apparatus 100. For example, two pivot connections 112 (e.g., including pivot shafts) may respectively couple the upper ends of the side segments 108A to the upper ends of the side segments 110A. Moreover, the two leg frames 108 and 110 can respectively have a plurality of wheel assemblies 113 for facilitating displacement of the child support apparatus 100 on a floor surface.

Referring to FIG. 1, the standing frame 102 can further include two sliding sleeves 114 and two linking bars 116 that are disposed symmetrically at the left and right sides of the standing frame 102. The two sliding sleeves 114 can be respectively connected slidably with the two side segments 110A of the leg frame 110, and can slide along the side segments 110A toward or away from the pivot connections 112. Each linking bar 116 can have two opposite end portions respectively coupled pivotally to one sliding sleeve 114 and one side segment 108A of the leg frame 108 via two pivot connections 118 and 120.

Referring again to FIG. 1, the handle frame 104 can be pivotally coupled to the standing frame 102 via two pivot connections 122. According to an example of construction, the handle frame 104 can include two side portions 104A disposed symmetrically at the left and right sides, and a grip portion 104B connected with the two side portions 104A. The two side portions 104A may be respectively coupled pivotally to the two sliding sleeves 114 via the two pivot connections 122.

According to an embodiment, the handle frame 104 may further have a foldable structure for facilitating storage or transport of the child support apparatus 100. For example, each side portion 104A of the handle frame 104 can include a segment 126 that is pivotally coupled to the grip portion 104B via a pivot connection 128. Moreover, each segment 126 can be pivotally coupled to one corresponding sliding sleeve 112 via one pivot connection 122. The grip portion 104B can rotate relative to the segments 126 to fold or unfold the handle frame 104, whereby the length of the handle frame 104 may be advantageously reduced for a more compact storage when the child support apparatus 100 is collapsed.

Referring again to FIG. 1, the child support apparatus 100 can further include two side bar portions 130 respectively disposed at the left and right sides of the juvenile support assembly 106. Each side bar portion 130 can be coupled pivotally to the standing frame 102 via the pivot connection 112, and can be coupled to one side portion 104A of the handle frame 104 via a linking bar 132. Because the pivot connection 112 also pivotally couples the side segment 108A of the leg frame 108 to the side segment 110A of the leg frame 110, each side bar portion 130 can be thereby coupled pivotally to the two leg frames 108 and 110. Each linking bar 132 can have two ends respectively coupled pivotally to the grip portion 104B of the handle frame 104 via a pivot connection 134 and to the side bar portion 130 via a pivot connection 136. Moreover, each side bar portion 130 can be further coupled pivotally to one segment 126 of the handle frame 104 via a pivot connection 138, which is located between the pivot connections 112 and 136 along the side bar portion 130.

According to an example of construction, the two side bar portions 130 may be further fixedly connected with a transversal portion 140, which can be disposed adjacent to a front of the juvenile support assembly 106. The two side bar portions 130 and the transversal portion 140 can form a U-shaped frame that is movably linked to the standing frame 102 and the handle frame 104.

Figure 7:
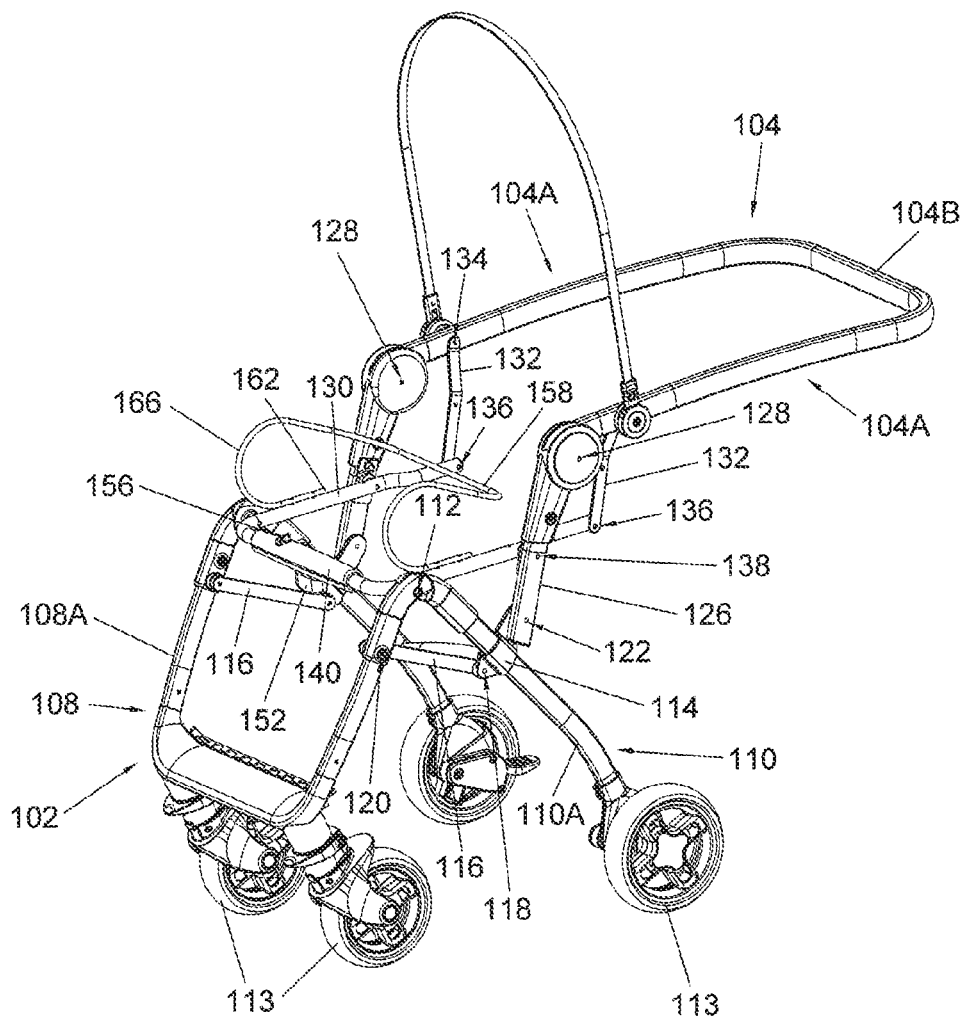
FIG. 7 is a perspective view illustrating the child support apparatus of FIG. 1 in an intermediate folded state.
Figure 8:
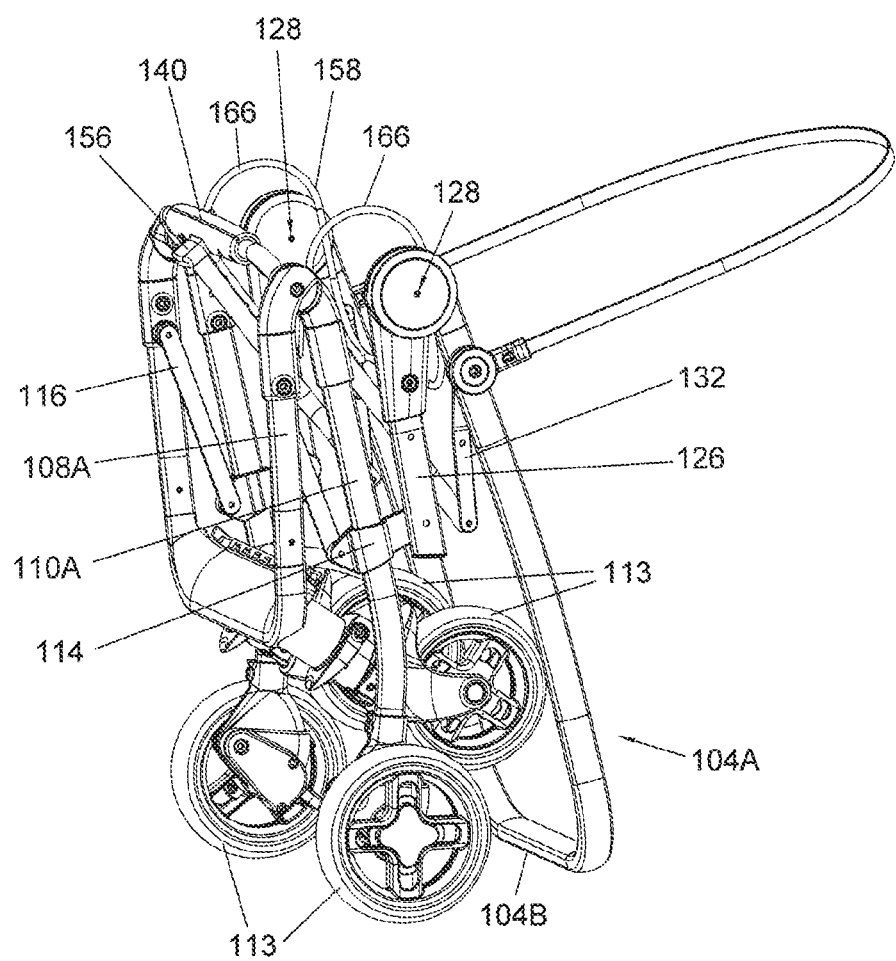
FIG. 8 is a perspective view illustrating the child support apparatus of FIG. 1 in a fully folded state.

With the aforementioned construction, the handle frame 104, the two leg frames 108 and 110 and the two side bar portions 130 can be movably linked to one another for facilitating folding and unfolding of the child support apparatus 100. For example, a caregiver can grasp and pull upward the transversal portion 140 for folding the child support apparatus 100. As the transversal portion 140 is pulled upward, the child support apparatus 100 can be lifted above a floor surface, and gravity action can assist in folding the child support apparatus 100. More specifically, the grip portion 104B of the handle frame 104 can rotate about the pivot connections 128 to fold over the segments 126, the two leg frames 108 and 110 can rotate about the pivot connections 112 toward each other, and the two side bar portions 130 can respectively rotate relative to the grip portion 104B and the segments 126 of the handle frame 104 and the two leg frames 108 and 110 so as to orient the transversal portion 140 upward. FIGS. 7 and 8 are perspective views illustrating exemplary operation of folding the child support apparatus 100.

In conjunction with FIG. 1, reference is made hereinafter to FIGS. 3-6 to further describe a locking mechanism 142 provided in the child support apparatus 100. Referring to FIGS. 1 and 3-6, each of the left and right sides of the child support apparatus 100 can include a locking mechanism 142 operable to lock the child support apparatus 100 in an unfolded state for use. The locking mechanism 142 can include a latch 144 and a spring 146. The latch 144 can be slidably assembled inside the segment 126 of the handle frame 104, and can slide relative to the segment 126 to engage and disengage a coupling plate 148 fixedly attached to the grip portion 104B of the handle frame 104. More specifically, the latch 144 can engage with a notch 150 provided on the coupling plate 148 to prevent folding of the grip portion 104B over the segments 126 and thereby lock the child support apparatus 100 in an unfolded state for use. When the latch 144 disengages from the notch 150, the grip portion 104B can rotate and fold over the segments 126 for collapsing the child support apparatus 100. The spring 146 can be respectively connected with the latch 144 and an anchor feature provided inside the segment 126. The spring 146 can bias the latch 144 for engagement with the notch 150 and thereby locking the child support apparatus 100 in the unfolded state for use.

The same locking mechanism 142 comprised of the latch 144 and the spring 146 described above can be provided at each of the left and right side of the child support apparatus 100.

Referring to FIGS. 1 and 3-6, the child support apparatus 100 can further include a release actuator 152 respectively connected with each latch 144 via a cable 154. According to an example of construction, the release actuator 152 can be a button, and can be slidably assembled with the transversal portion 140. Each cable 154 can have a first end connected with the latch 144 associated therewith, and a second end slidably assembled with a guide slot 152A provided in the release actuator 152. When the release actuator 152 is depressed, the second end of each cable 154 may be urged to slide along the corresponding guide slot 152A, which causes the cable 154 to pull the latch 144 coupled thereto to slide and disengage from the notch 150 for unlocking the child support apparatus 100.

According to an embodiment, the child support apparatus 100 may further include a safety lock 156 that is movably assembled with the transversal portion 140 at a location adjacent to the release actuator 152. For example, the safety lock 156 may be assembled with the transversal portion 140 for sliding movement to the left side and the right side. The safety lock 156 is movable between two positions: a first position where the safety lock 156 can engage with the release actuator 152 to prevent its movement in an unlocking direction, and a second position where the safety lock 156 is disengaged from the release actuator 152 so that the release actuator 152 can be depressed to unlock the child support apparatus 100. The safety lock 156 may be further connected with a spring (not shown) operable to bias the safety lock 156 to the aforementioned first position.

Referring again to FIGS. 1-3, the juvenile support assembly 106 can include a resilient wire 158 and a fabric 160 (shown with phantom lines in FIGS. 1 and 2). The resilient wire 158 can be made of a material capable of elastic deformation. Examples of materials for the resilient wire 158 can include, without limitation, steel, metallic alloys, plastic, or any other suitable materials capable of elastic deformation. The resilient wire 158 can extend between the left and right sides of the juvenile support assembly 106 with two opposite ends 162 of the resilient wire 158 being respectively anchored at the left and right sides of the juvenile support assembly 106. For example, the two ends 162 of the resilient wire 158 can be respectively attached fixedly to the two side bar portions 130, and the resilient wire 158 can extend above the two side bar portions 130. The resilient wire 158 can be configured to form a bearing support for a child that is elastically deformable along an upward-downward direction 164 of the juvenile support assembly 106. More specifically, the resilient wire 158 can include a plurality of bent portions between the two opposite ends 162 that respectively form a plurality of hinges allowing elastic deflection of the resilient wire 158 along the upward-downward direction 164.

Figure 2:
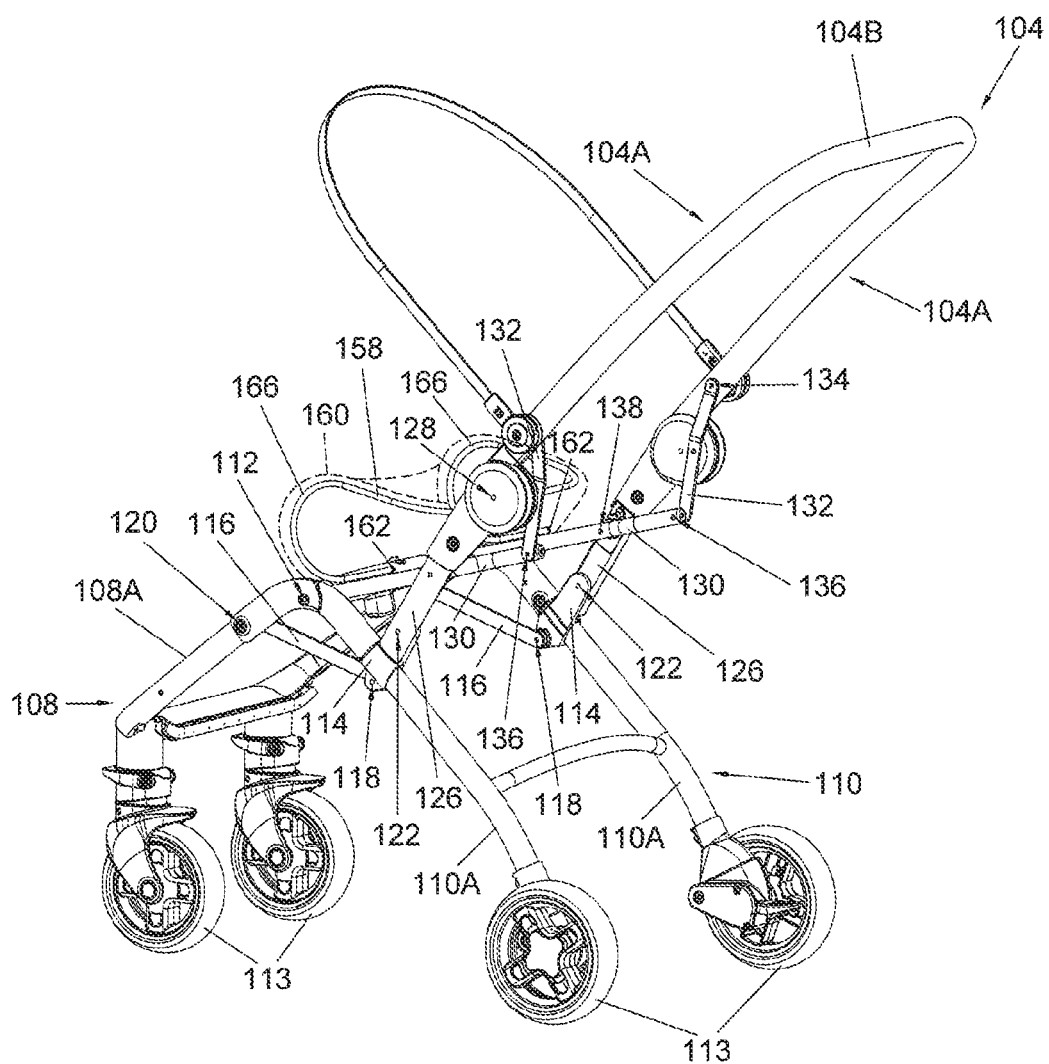
FIG. 2 is a perspective view illustrating the child support apparatus of FIG. 1 under another angle of view.
Figure 3:
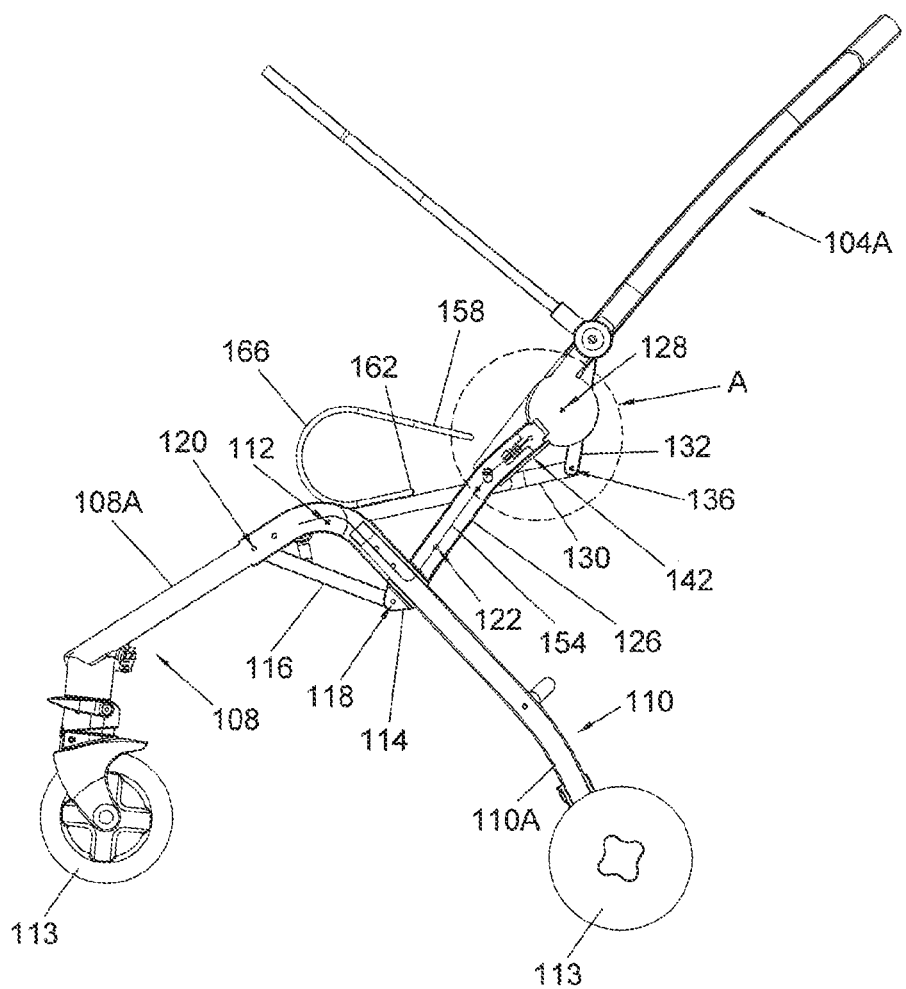
FIG. 3 is a schematic view illustrating a locking mechanism provided in the child support apparatus shown in FIG. 1.
Figure 4:
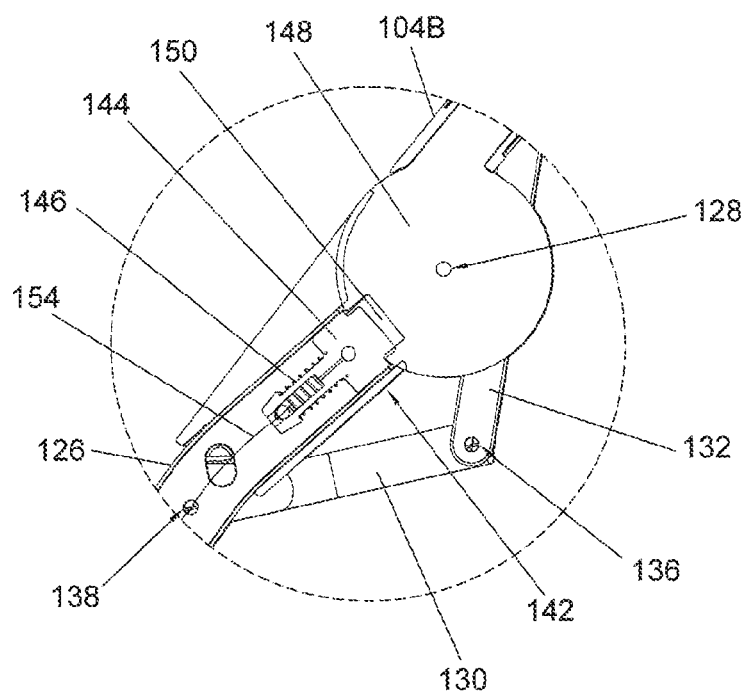
FIG. 4 is an enlarged view of portion A shown in FIG. 3.
Figure 5:
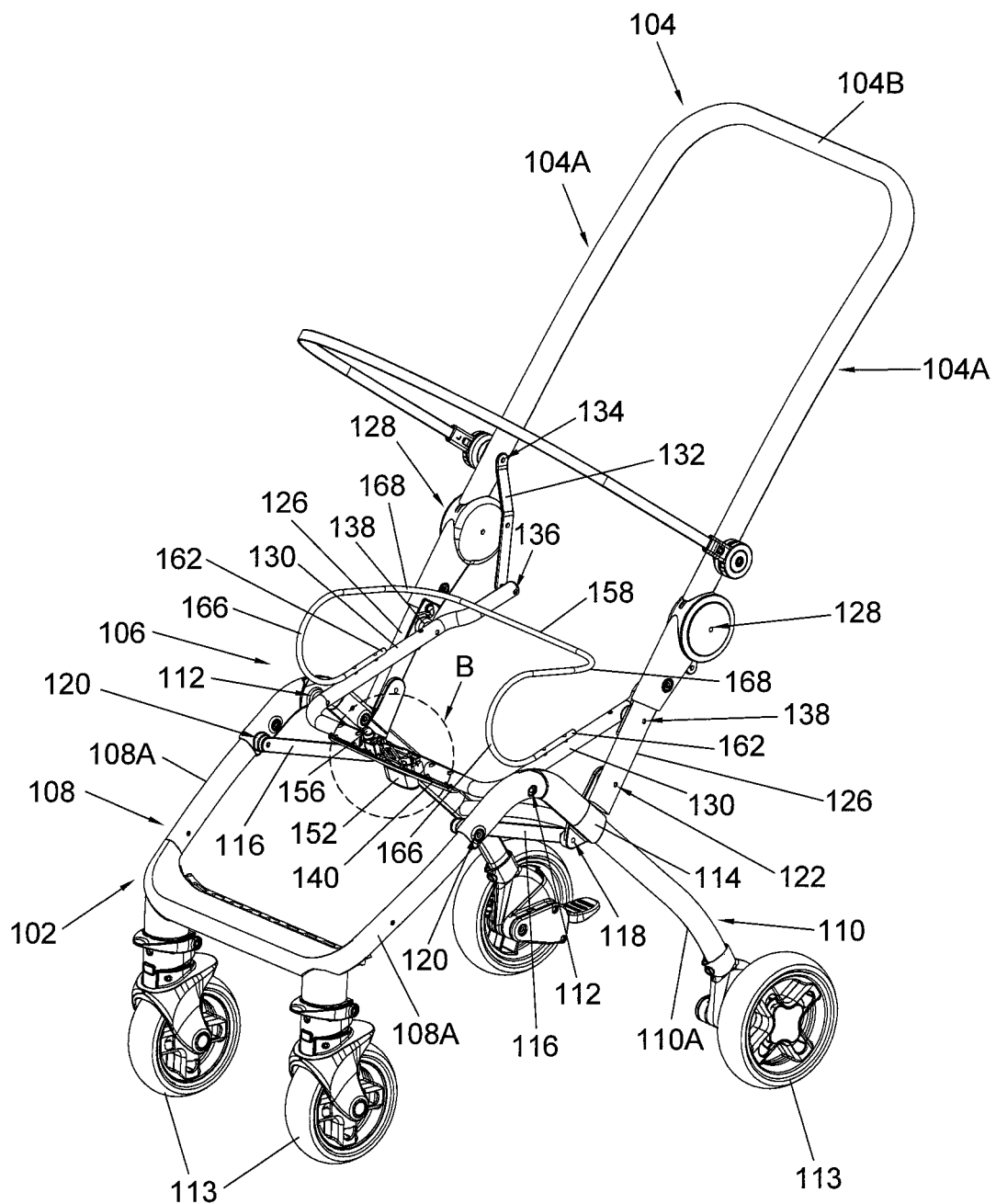
FIG. 5 is a schematic view illustrating the assembly of a release actuator and a safety lock in the child support apparatus shown in FIG. 1.
Figure 6:
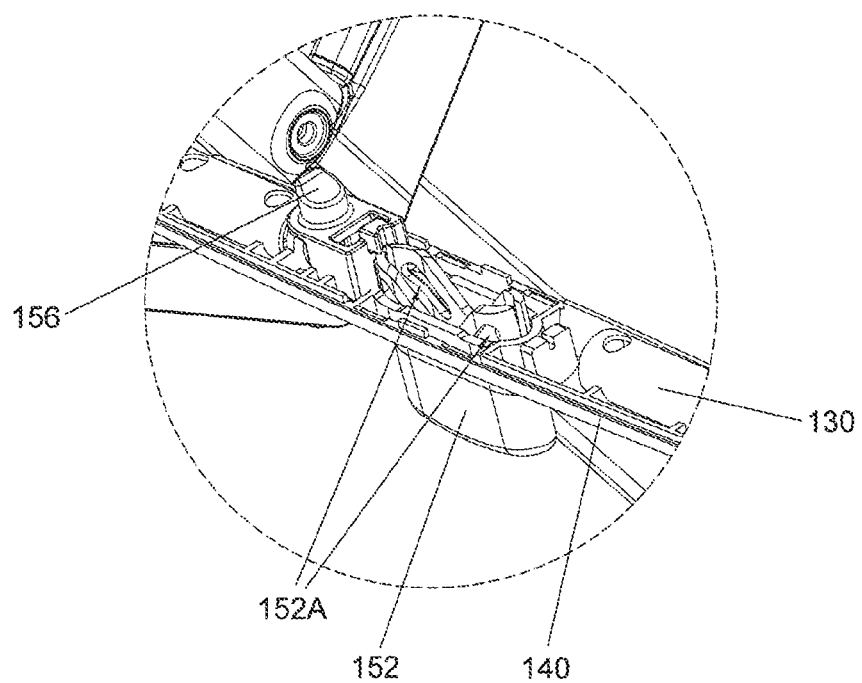
FIG. 6 is an enlarged view of portion B shown in FIG. 5.

According to an example of construction, the resilient wire 158 shown in the embodiment of FIGS. 1-3 can have two bent portions 166 turning generally vertically, and two bent portions 168 turning generally horizontally. Each of the two bent portions 166 can have a U-shape, and each of the two bent portions 168 can have a L-shape. From one end 162 to the other end 162, the resilient wire 158 can sequentially form one bent portion 166, form one bent portion 168, extend generally linearly along a transversal direction, form the other bent portion 168 and eventually form the other bent portion 166. When the child support apparatus 100 is in an unfolded state for use, the resilient wire 158 can extend higher than the pivot connections 112, 118 and 120.

The fabric 160 is schematically shown with phantom lines in FIGS. 1 and 2, and omitted in the other figures to better show features of the frame structure. The fabric 160 can be stretched across the resilient wire 158, and at least partially cover the resilient wire 158 to at least partially form an outer envelop of the juvenile support assembly 106. When a child is received on the juvenile support assembly 106, the child can sit on the fabric 160, which is supported at least partially by the resilient wire 158. During use, the ability of the resilient wire 158 to deform elastically allows to dissipate a part of undesirable vibrations and/or shock energy that may be transmitted from the standing frame 102 to the juvenile support assembly 106, thereby providing a more comfortable support for the child.

FIGS. 9-12 are schematic views illustrating some other examples of suitable shapes for the resilient wire 158. Like in the aforementioned embodiment, the resilient wire 158 shown in FIGS. 9-12 can have one or more bent portions allowing elastic deflection of the resilient wire 158 along the upward-downward direction 164.

Figure 9:
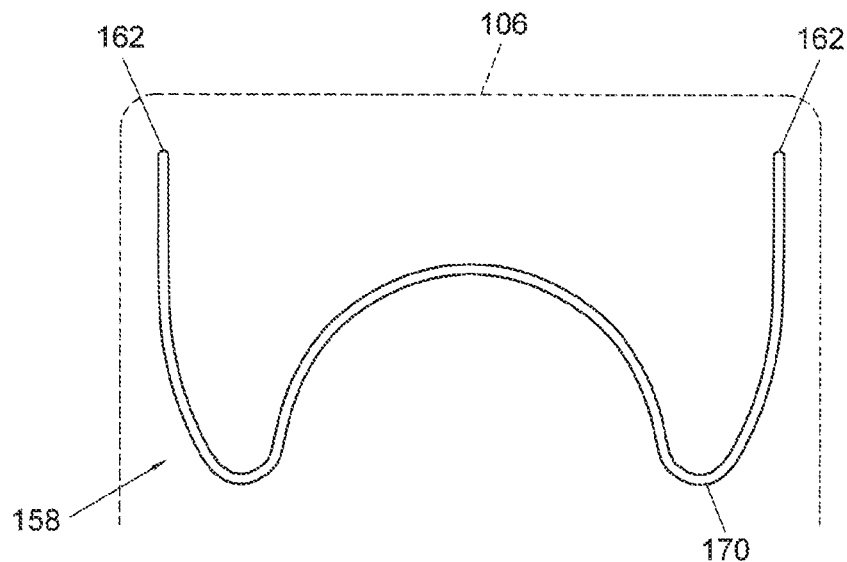
FIGS. 9-12 are planar views illustrating various examples of shapes for a resilient wire that is incorporated in a juvenile support assembly of the child support apparatus to provide cushioned support for a child.

In the example of FIG. 9, the resilient wire 158 is bent to form a wave shape 170 between the two opposite ends 162. The resilient wire 158 shown in FIG. 9 may be disposed with the two ends 162 respectively affixed at a left and a right side of the juvenile support assembly 106 and with the wave shape 170 stretching transversally and back and forth between a front and a rear end of the juvenile support assembly 106.

Figure 10:
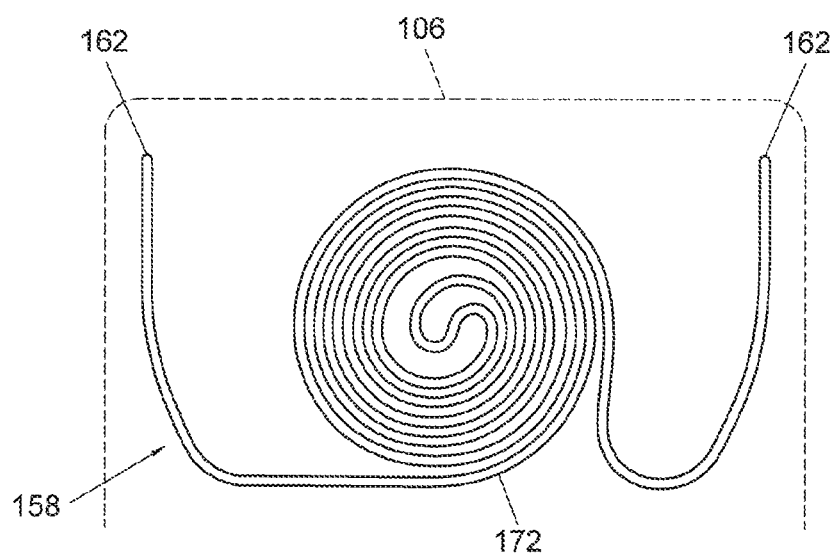

In the example of FIG. 10, the resilient wire 158 is bent to form a spiral shape 172 between the two opposite ends 162. The resilient wire 158 shown in FIG. 10 may be disposed with the two ends 162 respectively affixed at a left and a right side of the juvenile support assembly 106 and with the spiral shape 172 located in a central region of the juvenile support assembly 106.

Figure 11:
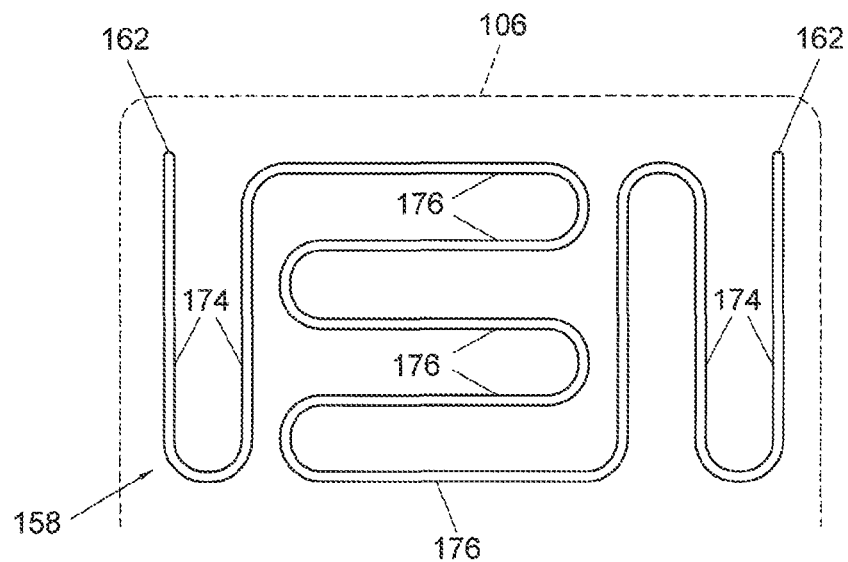

In the example of FIG. 11, the resilient wire 158 is bent into a shape including multiple sections 174 and 176 extending along different directions. The resilient wire 158 shown in FIG. 10 may be disposed with the two ends 162 respectively affixed at a left and a right side of the juvenile support assembly 106, the sections 174 extending generally parallel to one another along a lengthwise axis extending from a front to a rear of the juvenile support assembly 106, and the sections 176 extending generally parallel to one another along a transversal axis extending from the left to the right side of the juvenile support assembly 106.

Figure 12:
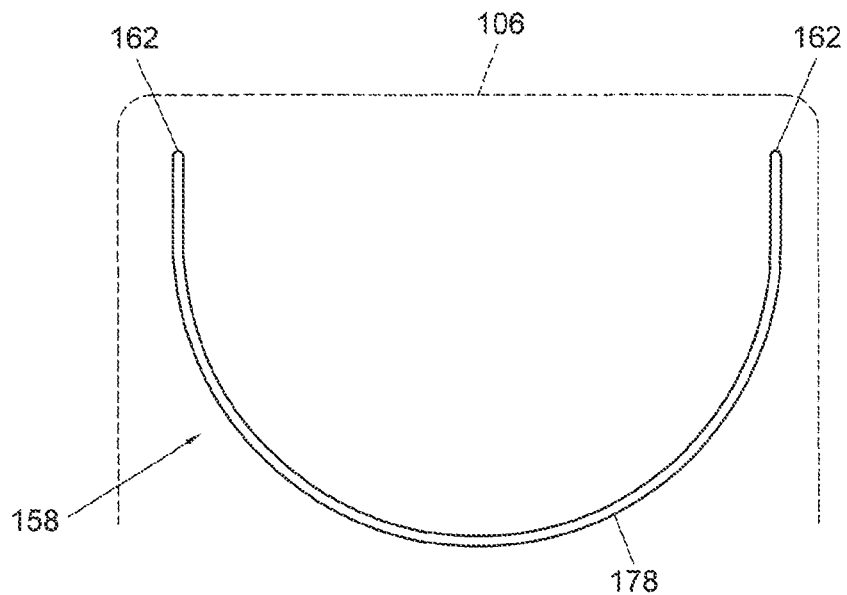

In the example of FIG. 12, the resilient wire 158 is bent to form an arc shape 178 between the two opposite ends 162. The resilient wire 158 shown in FIG. 12 may be disposed with the two ends 162 respectively affixed at a left and a right side of the juvenile support assembly 106, the arc shape 178 extending across a width of the juvenile support assembly 106.

Depending on the desired cushioning effect, two or more of the resilient wires 158 described herein may be provided in the juvenile support assembly 106. Moreover, the resilient wire 158 may be bent to include more than one of the shapes described herein. Reference is made hereinafter to FIGS. 13-19 to describe other examples of child support apparatuses that may include a juvenile support assembly using the resilient wire 158 described herein.

Figure 13:
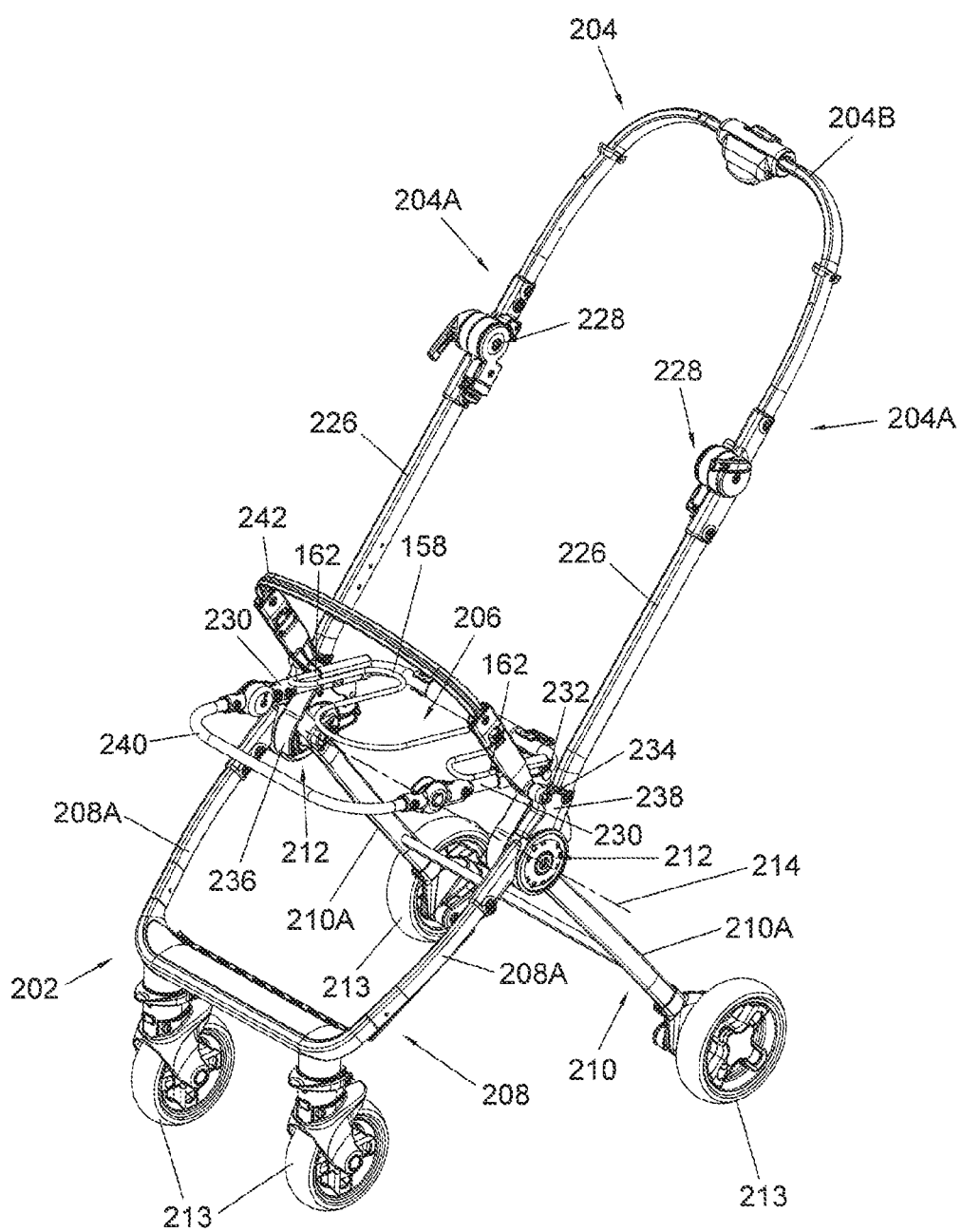
FIGS. 13-19 are perspective views illustrating various examples of child support apparatuses having a juvenile support assembly that incorporates a resilient wire to provide cushioned support for a child.

FIG. 13 is a perspective view illustrating another child support apparatus 200 incorporating the resilient wire 158 described herein. The child support apparatus 200 is a child stroller apparatus, and can include a standing frame 202, a handle frame 204 connected with the standing frame 202, and a juvenile support assembly 206 comprised of the resilient wire 158 that is supported on the standing frame 202.

The standing frame 202 can include two leg frames 208 and 210 connected with each other. The leg frame 208 can be exemplary a front leg frame, and the leg frame 210 can be exemplary a rear leg frame. Each of the leg frames 208 and 210 can respectively include two side segments disposed symmetrically at a left and a right side of the standing frame 202, e.g., two side segments 208A for the leg frame 208 and two side segments 210A for the leg frame 210. The two side segments 208A of the leg frame 208 can be respectively coupled pivotally to the two side segments 210A of the leg frame 210 via two pivot connections 212, so that the leg frames 208 and 210 can rotate relative to each other during folding and unfolding of the child support apparatus 200. Moreover, the two leg frames 208 and 210 can respectively have a plurality of wheel assemblies 213 for facilitating displacement of the child support apparatus 200 on a floor surface.

Referring again to FIG. 13, the handle frame 204 can be pivotally coupled to the standing frame 202 via the two pivot connections 212. According to an example of construction, the handle frame 204 can include two side portions 204A disposed symmetrically at the left and right sides, and a grip portion 204B connected with the two side portions 204A. The two side portions 204A may be respectively coupled pivotally to the two leg frames 208 and 210 via the two pivot connections 212. The handle frame 204 and the two leg frames 208 and 210 can be thereby connected pivotally with one another about a common pivot axis 214 defined by the pivot connections 212.

According to an embodiment, the handle frame 204 may further have a foldable structure for facilitating storage or transport of the child support apparatus 200. For example, each side portion 204A can include a segment 226 that is pivotally coupled to the grip portion 204B via a pivot connection 228. The two segments 226 can be respectively coupled pivotally to the standing frame 202 via the two pivot connections 212. The grip portion 204B can rotate relative to the segments 226 about the pivot connections 228 to fold or unfold the handle frame 204, whereby the length of the handle frame 204 may be advantageously reduced for a more compact storage when the child support apparatus 200 is collapsed.

Referring again to FIG. 13, the child support apparatus 200 can further include two side bar portions 230 respectively disposed at the left and right sides of the juvenile support assembly 206. Each side bar portion 230 can be coupled pivotally to the standing frame 202 via a pivot connection 232, and to one side portion 204A of the handle frame 204 via a pivot connection 234. For example, the pivot connection 232 can include pivotally connecting the side bar portion 230 with a coupling part 236 that is fixedly attached to one side segment 210A of the leg frame 210, and the pivot connection 234 can include pivotally connecting the side bar portion 230 with a coupling part 238 that is fixedly attached to the segment 226 of the handle frame 204. Moreover, the two side bar portions 230 can be further connected with a transversal portion 240 disposed at a front of the juvenile support assembly 206.

The child support apparatus 200 can further include a guard member 242 having a generally U-shape and extending to the left and right sides of the juvenile support assembly 206. According to an example of construction, the guard member 242 may have two opposite ends respectively connected with the two coupling parts 238 that are fixedly attached to the side portions 204A of the handle frame 204. The guard member 242 can restrict lateral and forward movement of a child sitting on the juvenile support assembly 206.

The juvenile support assembly 206 can include the resilient wire 158 configured to form a bearing support for a child that is elastically deformable along an upward-downward direction Like previously described, the two ends 162 of the resilient wire 158 can be respectively attached fixedly to the two side bar portions 230, and the resilient wire 158 can extend above the two side bar portions 230. While the resilient 158 is shown as having a specific shape in FIG. 13, it will be appreciated that any shapes described herein may be suitable. When the child support apparatus 200 is in an unfolded state for use, the resilient wire 158 may extend higher than the pivot connections 212, the transversal portion 240 can be positionable to extend in front of the resilient wire 158, and the guard member 242 can extend above the resilient wire 158.

Moreover, the juvenile support assembly 206 may further include a fabric (not shown for clarity) that can cover at least partially the resilient wire 158 and form at least partially an outer envelop of the juvenile support assembly 206, like previously described.

Figure 14:
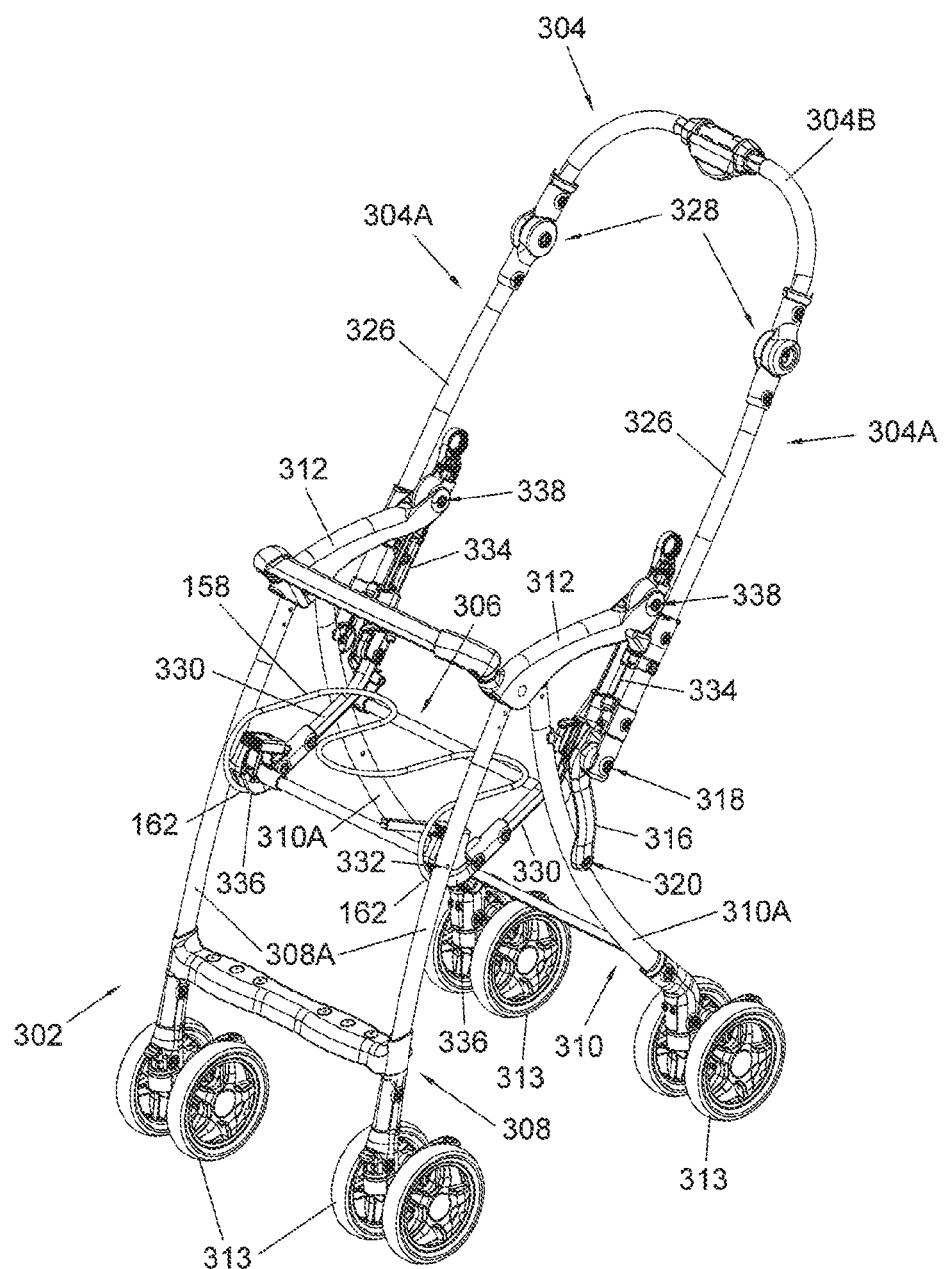

FIG. 14 is a perspective view illustrating another child support apparatus 300 incorporating the resilient wire 158 described herein. The child support apparatus 300 is a child stroller apparatus, and can include a standing frame 302, a handle frame 304 connected with the standing frame 302, and a juvenile support assembly 306 comprised of the resilient wire 158 that is supported on the standing frame 302.

The standing frame 302 can include two leg frames 308 and 310 connected with each other via two armrests 312, the leg frame 308 being a front leg frame and the leg frame 310 being a rear leg frame. Each of the leg frames 308 and 310 can respectively include two side segments disposed symmetrically at a left and a right side of the standing frame 302, e.g., two side segments 308A for the leg frame 308 and two side segments 310A for the leg frame 310. At each of the left and right sides, the side segment 308A of the leg frame 308 and the side segment 310A of the leg frame 310 can be respectively coupled pivotally to one armrest 312, so that the leg frames 308 and 310 can rotate relative to each other during folding and unfolding of the child support apparatus 300. Moreover, the two leg frames 308 and 310 can respectively have a plurality of wheel assemblies 313 for facilitating displacement of the child support apparatus 300 on a floor surface.

Referring again to FIG. 14, the handle frame 304 can be pivotally coupled to the standing frame 302 via two linking bars 316. According to an example of construction, the handle frame 304 can include two side portions 304A disposed symmetrically at the left and right sides, and a grip portion 304B connected with the two side portions 304A. At each of the left and right sides, the side portion 304A of the handle frame 304 may be coupled to the side segment 310A of the leg frame 310 via the linking bar 316, two opposite ends of the linking bar 316 being respectively coupled pivotally to the side portion 304A of the handle frame 304 via a pivot connection 318 and to the side segment 310A of the leg frame 310 via a pivot connection 320.

According to an embodiment, the handle frame 304 may further have a foldable structure for facilitating storage or transport of the child support apparatus 300. For example, each side portion 304A can include a segment 326 that is pivotally coupled to the grip portion 304B via a pivot connection 328. The two segments 326 can be respectively coupled to the standing frame 302 via the two linking bars 316. The grip portion 304B can rotate relative to the segments 326 about the pivot connections 328 to fold or unfold the handle frame 304.

Referring again to FIG. 14, the child support apparatus 300 can further include two side bar portions 330 respectively disposed at the left and right sides of the juvenile support assembly 306. Each side bar portion 330 can be respectively coupled to the standing frame 302 via a pivot connection 332 and a carrier bar 334. The pivot connection 332 can include, e.g., a coupling part 336 that is fixedly attached to the side bar portion 330 and is pivotally connected with the corresponding side segment 308A of the leg frame 308. Moreover, the side bar portion 330 can be pivotally coupled to the carrier bar 334 via the same pivot connection 318 that pivotally couples the side portion 304A of the handle frame 304 to the linking bar 316. Accordingly, the side portion 304A of the handle frame 304, the linking bar 316, the carrier bar 334 and the side bar portion 330 can be pivotally connected with one another about a common pivot axis defined by the pivot connection 318 at each of the left and right sides of the child support apparatus 300. The carrier bar 334 can be further coupled pivotally to the armrest 312 via a pivot connection 338 at a location distant from the pivot connection 318. This frame construction allows adjustment of the handle frame 304 between two distinct positions for pushing the child support apparatus 300 in different directions with a child facing forward or rearward.

The juvenile support assembly 306 can include the resilient wire 158 configured to form a bearing support for a child that is elastically deformable along an upward-downward direction. The two ends 162 of the resilient wire 158 can be respectively attached fixedly to the two side bar portions 330, and the resilient wire 158 can extend above the two side bar portions 330. In the embodiment shown in FIG. 14, the two ends 162 of the resilient wire 158 may be exemplary attached fixedly to the two coupling parts 336 that are fixedly connected to the two side bar portions 330 at the front of the juvenile support assembly 306. While the resilient 158 is shown as having a specific shape in FIG. 14, it will be appreciated that any shapes described herein may be suitable. Like described previously, the juvenile support assembly 306 may further include a fabric (not shown for clarity) that can cover at least partially the resilient wire 158.

Figure 15:
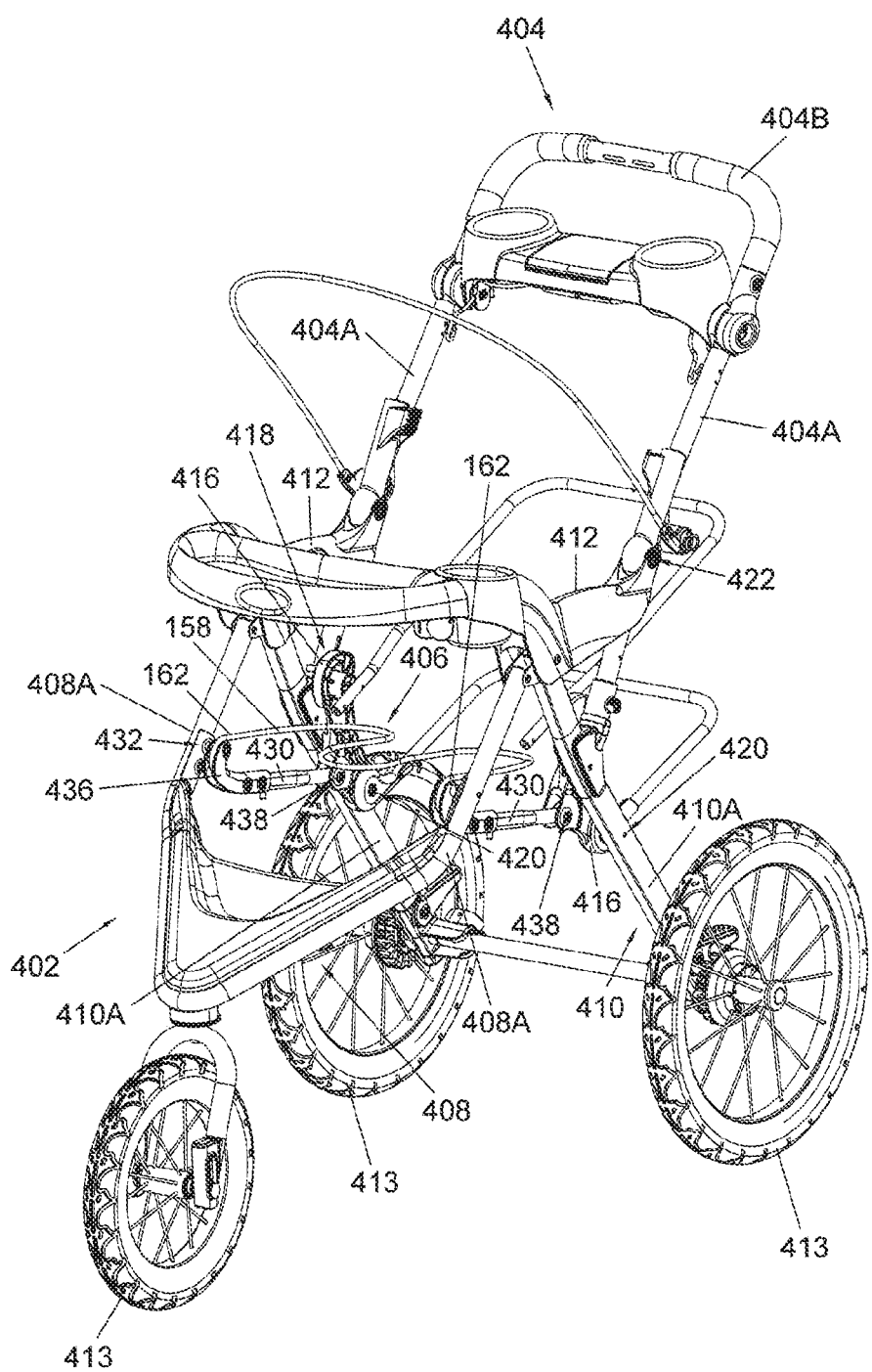

FIG. 15 is a perspective view illustrating another child support apparatus 400 incorporating the resilient wire 158 described herein. The child support apparatus 400 is a child stroller apparatus, and can include a standing frame 402, a handle frame 404 connected with the standing frame 402, and a juvenile support assembly 406 comprised of the resilient wire 158 that is supported on the standing frame 402.

The standing frame 402 can include two leg frames 408 and 410 connected with each other via two armrests 412, the leg frame 408 being a front leg frame and the leg frame 410 being a rear leg frame. Each of the leg frames 408 and 410 can respectively include two side segments disposed symmetrically at a left and a right side of the standing frame 402, e.g., two side segments 408A for the leg frame 408 and two side segments 410A for the leg frame 410. At each of the left and right sides, the side segment 408A of the leg frame 408 and the side segment 410A of the leg frame 410 can be respectively coupled pivotally to one armrest 412, so that the leg frames 408 and 410 can rotate relative to each other during folding and unfolding of the child support apparatus 400. Moreover, the two leg frames 408 and 410 can respectively have a plurality of wheel assemblies 413 for facilitating displacement of the child support apparatus 400 on a floor surface.

Referring again to FIG. 15, the handle frame 404 can be pivotally coupled to the standing frame 402 via two linking parts 416. According to an example of construction, the handle frame 404 can include two side portions 404A disposed symmetrically at the left and right sides, and a grip portion 404B connected with the two side portions 404A. At each of the left and right sides, the side portion 404A of the handle frame 404 may be coupled to the side segment 410A of the leg frame 410 via one linking part 416, the linking part 416 being respectively coupled pivotally to the side portion 404A of the handle frame 404 via a pivot connection 418 and to the side segment 410A of the leg frame 410 via a pivot connection 420. Moreover, each side portion 404A of the handle frame 404 can be pivotally coupled to one armrest 412 via a pivot connection 422.

As shown in FIG. 15, the child support apparatus 400 can further include two side bar portions 430 respectively disposed at the left and right sides of the juvenile support assembly 406. Each side bar portion 430 can be respectively coupled to the standing frame 402 via a pivot connection 432 and one linking part 416. The pivot connection 432 can include, e.g., a coupling part 436 that is fixedly attached to the side bar portion 430 and is pivotally connected with the corresponding side segment 408A of the leg frame 408. Moreover, the side bar portion 430 can be pivotally coupled to the linking part 416 via a pivot connection 438 that is distinct from the pivot connections 418 and 420.

The juvenile support assembly 406 can include the resilient wire 158 configured to form a bearing support for a child that is elastically deformable along an upward-downward direction. The two ends 162 of the resilient wire 158 can be respectively attached fixedly to the two side bar portions 430, and the resilient wire 158 can extend above the two side bar portions 430. In the embodiment shown in FIG. 15, the two ends 162 of the resilient wire 158 may be exemplary attached fixedly to the two coupling parts 436 that are fixedly connected to the two side bar portions 430 at the front of the juvenile support assembly 406. While the resilient 158 is shown as having a specific shape in FIG. 15, it will be appreciated that any shapes described herein may be suitable. Like described previously, the juvenile support assembly 406 may further include a fabric (not shown for clarity) that can cover at least partially the resilient wire 158.

Figure 16:
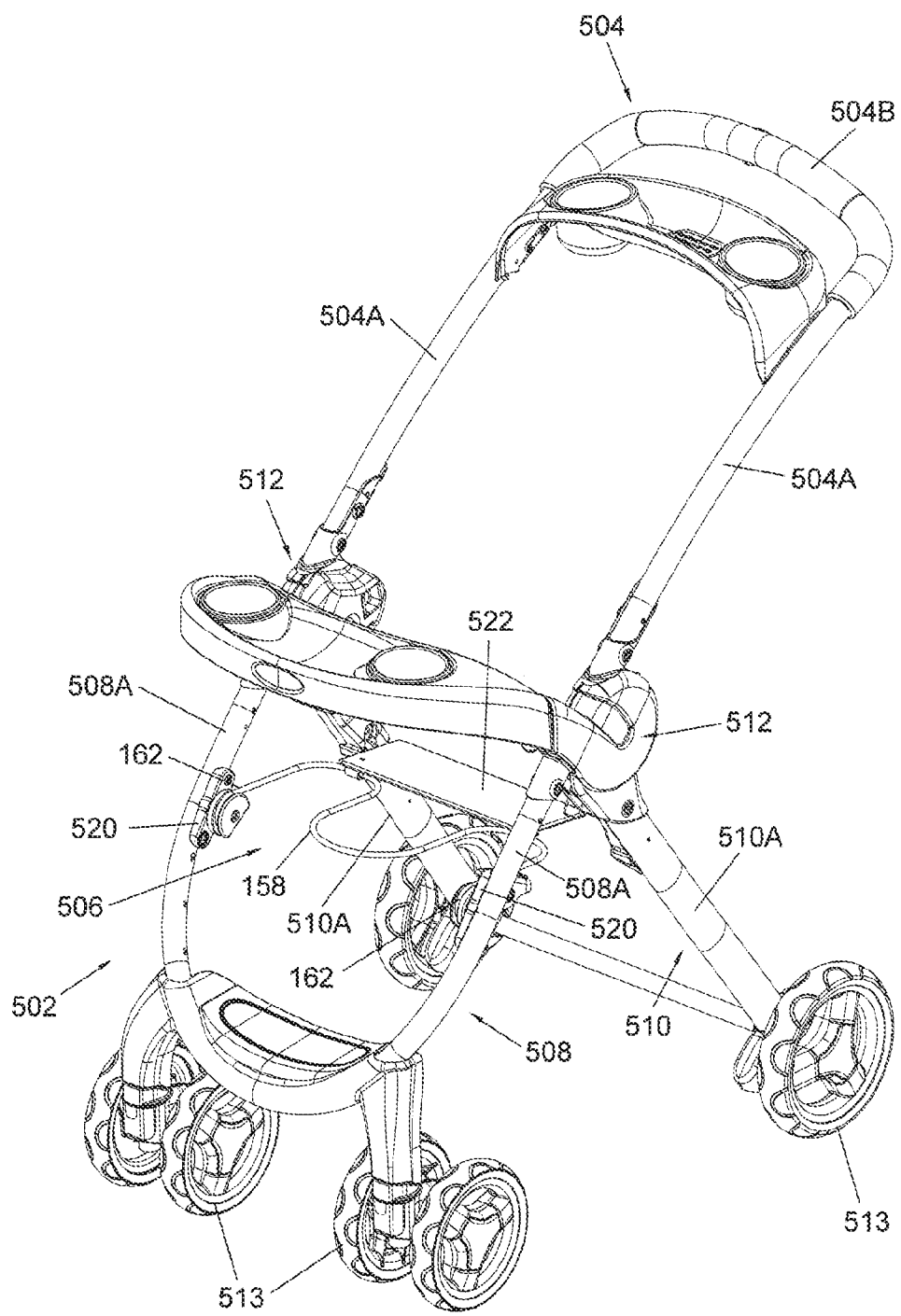

FIG. 16 is a perspective view illustrating another child support apparatus 500 incorporating the resilient wire 158 described herein. The child support apparatus 500 is a child stroller apparatus, and can include a standing frame 502, a handle frame 504 connected with the standing frame 502, and a juvenile support assembly 506 comprised of the resilient wire 158 that is supported on the standing frame 502.

The standing frame 502 can include two leg frames 508 and 510 connected with each other via two pivot joints 512 at the left and right sides, the leg frame 508 being a front leg frame and the leg frame 510 being a rear leg frame. Each of the leg frames 508 and 510 can respectively include two side segments disposed symmetrically at a left and a right side of the standing frame 502, e.g., two side segments 508A for the leg frame 508 and two side segments 510A for the leg frame 510. At each of the left and right sides, the side segment 508A of the leg frame 508 and the side segment 510A of the leg frame 510 can be coupled pivotally to each other via the pivot joint 512, so that the leg frames 508 and 510 can rotate relative to each other during folding and unfolding of the child support apparatus 500. Moreover, the two leg frames 508 and 510 can respectively have a plurality of wheel assemblies 513 for facilitating displacement of the child support apparatus 500 on a floor surface.

Referring again to FIG. 16, the handle frame 504 can be pivotally coupled to the standing frame 502 via the two pivot joints 512. According to an example of construction, the handle frame 504 can include two side portions 504A disposed symmetrically at the left and right sides, and a grip portion 504B connected with the two side portions 504A. At each of the left and right sides, the side portion 504A of the handle frame 504 may be respectively coupled pivotally to the side segment 508A of the leg frame 508 and the side segment 510A of the leg frame 510 via one pivot joint 512. In this manner, the handle frame 504 and the leg frames 508 and 510 can rotate relative to one another during folding and unfolding of the child support apparatus 500.

As shown in FIG. 16, the juvenile support assembly 506 can include the resilient wire 158 configured to form a bearing support for a child that is elastically deformable along an upward-downward direction. The two opposite ends 162 of the resilient wire 158 can be respectively attached fixedly to the two side segments 508A of the leg frame 508 at the left and right sides of the juvenile support assembly 506. For example, each end 162 of the resilient wire 158 may be attached to a wire anchoring part 520 that is fixedly connected with each side segment 508A of the leg frame 508. Moreover, the resilient wire 158 may be connected with a board 522 that can extend generally transversally behind the resilient wire 158 and can be connected with the two side segments 510A of the leg frame 510. While the resilient 158 is shown as having a specific shape in FIG. 16, it will be appreciated that any shapes described herein may be suitable Like described previously, the juvenile support assembly 506 may further include a fabric (not shown for clarity) that can cover at least partially the resilient wire 158.

When the child support apparatus 500 is in an unfolded state for use, the resilient wire 158 and the board 522 can be located below the pivot joints 512, and can provide a cushioned support for a child.

Figure 17:
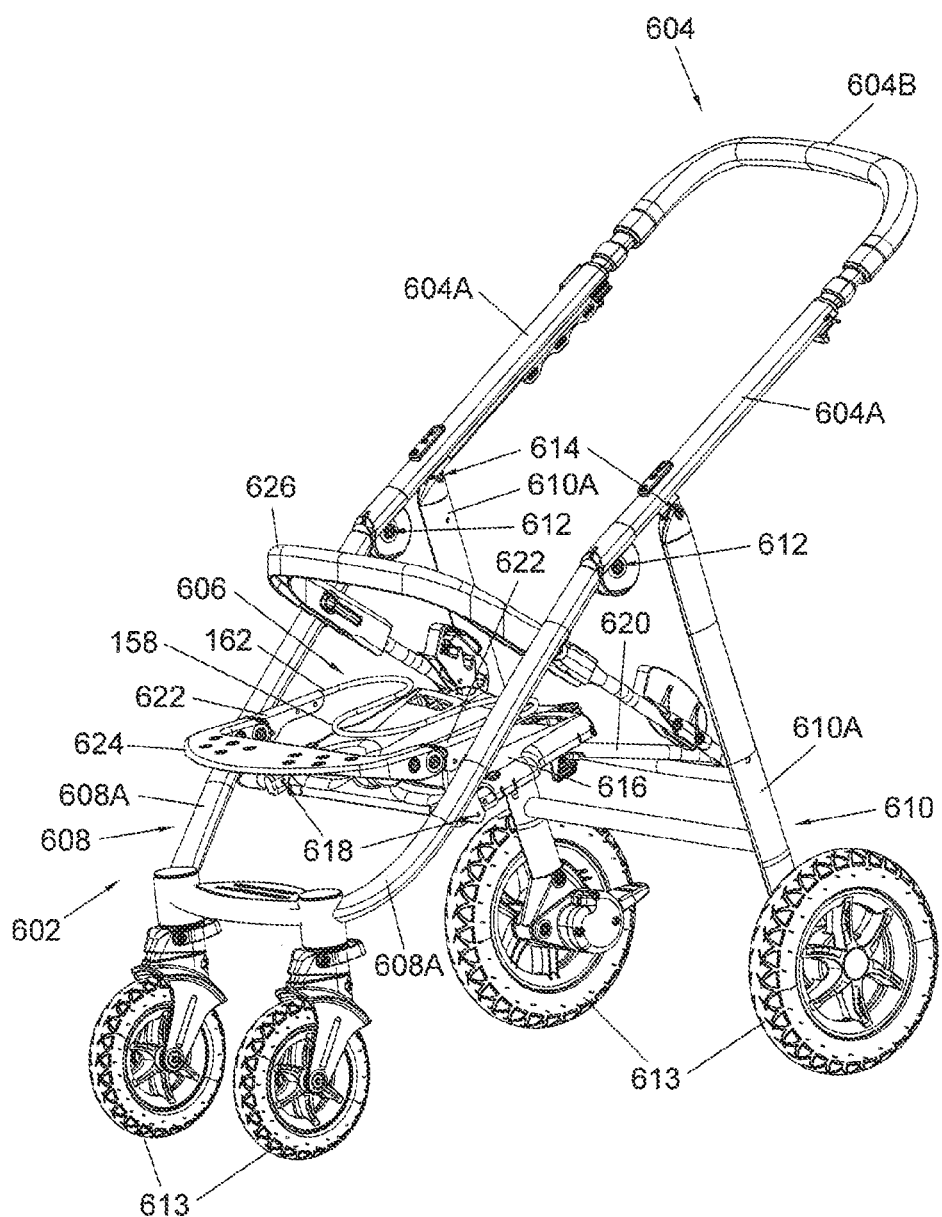

FIG. 17 is a perspective view illustrating another child support apparatus 600 incorporating the resilient wire 158 described herein. The child support apparatus 600 is a child stroller apparatus, and can include a standing frame 602, a handle frame 604 connected with the standing frame 602, and a juvenile support assembly 606 comprised of the resilient wire 158 that is supported on the standing frame 602.

The standing frame 602 can include two leg frames 608 and 610, the leg frame 608 being a front leg frame and the leg frame 610 being a rear leg frame. Each of the leg frames 608 and 610 can respectively include two side segments disposed symmetrically at a left and a right side of the standing frame 602, e.g., two side segments 608A for the leg frame 608 and two side segments 610A for the leg frame 610. The handle frame 604 can include two side portions 604A disposed symmetrically at the left and right sides, and a grip portion 604B connected with the two side portions 604A. At each of the left and right sides, the side segment 608A of the leg frame 608 and the side segment 610A of the leg frame 610 can be respectively coupled pivotally to the side portion 604A of the handle frame 604 via two distinct pivot connections 612 and 614, so that the handle frame 604 and the leg frames 508 and 510 can rotate relative to one another during folding and unfolding of the child support apparatus 600. Moreover, the two leg frames 608 and 610 can respectively have a plurality of wheel assemblies 613 for facilitating displacement of the child support apparatus 600 on a floor surface.

Referring to FIG. 17, the juvenile support assembly 606 can include a seat board 616 and the resilient wire 158. The seat board 616 can be coupled to the standing frame 602 via two pivot connections 618 and two linking bar portions 620. For example, at each of the left and right sides, the seat board 616 can be respectively coupled pivotally to the two side segments 608A of the leg frame 608 via the two pivot connections 618, and can be coupled to the two side segments 610A of the leg frame 610 via the two linking bar portions 620. At each of the left and right sides, each linking bar portion 620 can be respectively connected pivotally with the seat board 616 and one side segment 610A of the leg frame 610. With this assembly, the handle frame 604, the leg frames 608 and 610, the seat board 616 and the linking bar portions 620 can be movably linked to one another for folding and unfolding of the child support apparatus 600.

The resilient wire 158 can be fixedly attached to the seat board 616. For example, the seat board 616 can have two brackets 622, and the resilient wire 158 may be disposed above the seat board 161 with the two ends 162 of the resilient wire 158 respectively fastened to the two brackets 622. While the resilient 158 is shown as having a specific shape in FIG. 17, it will be appreciated that any shapes described herein may be suitable.

Moreover, the juvenile support assembly 606 may include a transversal portion 624 pivotally connected with the two brackets 622 in front of the resilient wire 158. The transversal portion 624 may serve as an adjustable leg resting member for a child Like described previously, a fabric (not shown for clarity) may be provided to cover at least partially the resilient wire 158.

As shown in FIG. 17, the child support apparatus 600 may further include a guard member 626 that is respectively connected with the two side segments 608A of the leg frame 608 and the two side segments 610A of the leg frame 610. When the child support apparatus 600 is unfolded for use, the guard member 626 can extend above the juvenile support assembly 606 and restrict movement of a child sitting on the juvenile support assembly 606.

Figure 18:
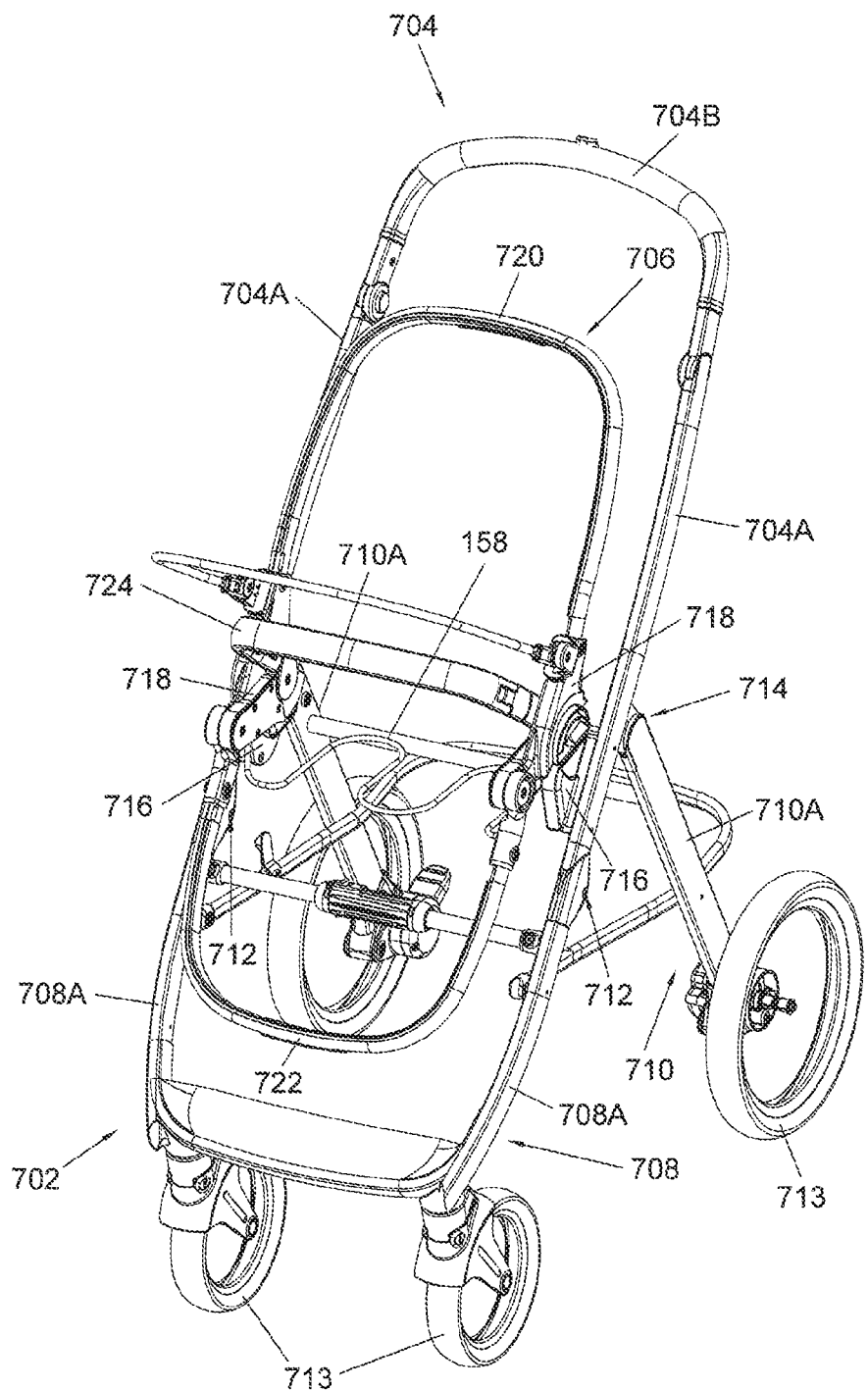

FIG. 18 is a perspective view illustrating another child support apparatus 700 incorporating the resilient wire 158 described herein. The child support apparatus 700 is a child stroller apparatus, and can include a standing frame 702, a handle frame 704 connected with the standing frame 702, and a juvenile support assembly 706 comprised of the resilient wire 158 that is supported on the standing frame 702.

The standing frame 702 can include two leg frames 708 and 710, the leg frame 708 being a front leg frame and the leg frame 710 being a rear leg frame. Each of the leg frames 708 and 710 can respectively include two side segments disposed symmetrically at a left and a right side of the standing frame 702, e.g., two side segments 708A for the leg frame 708 and two side segments 710A for the leg frame 710. The handle frame 704 can include two side portions 704A disposed symmetrically at the left and right sides, and a grip portion 704B connected with the two side portions 704A. At each of the left and right sides, the side segment 708A of the leg frame 708 and the side segment 710A of the leg frame 710 can be respectively coupled pivotally to the side portion 704A of the handle frame 704 via two distinct pivot connections 712 and 714, so that the handle frame 704 and the leg frames 708 and 710 can rotate relative to one another during folding and unfolding of the child support apparatus 700. Moreover, the two leg frames 708 and 710 can respectively have a plurality of wheel assemblies 713 for facilitating displacement of the child support apparatus 700 on a floor surface.

Figure 19:
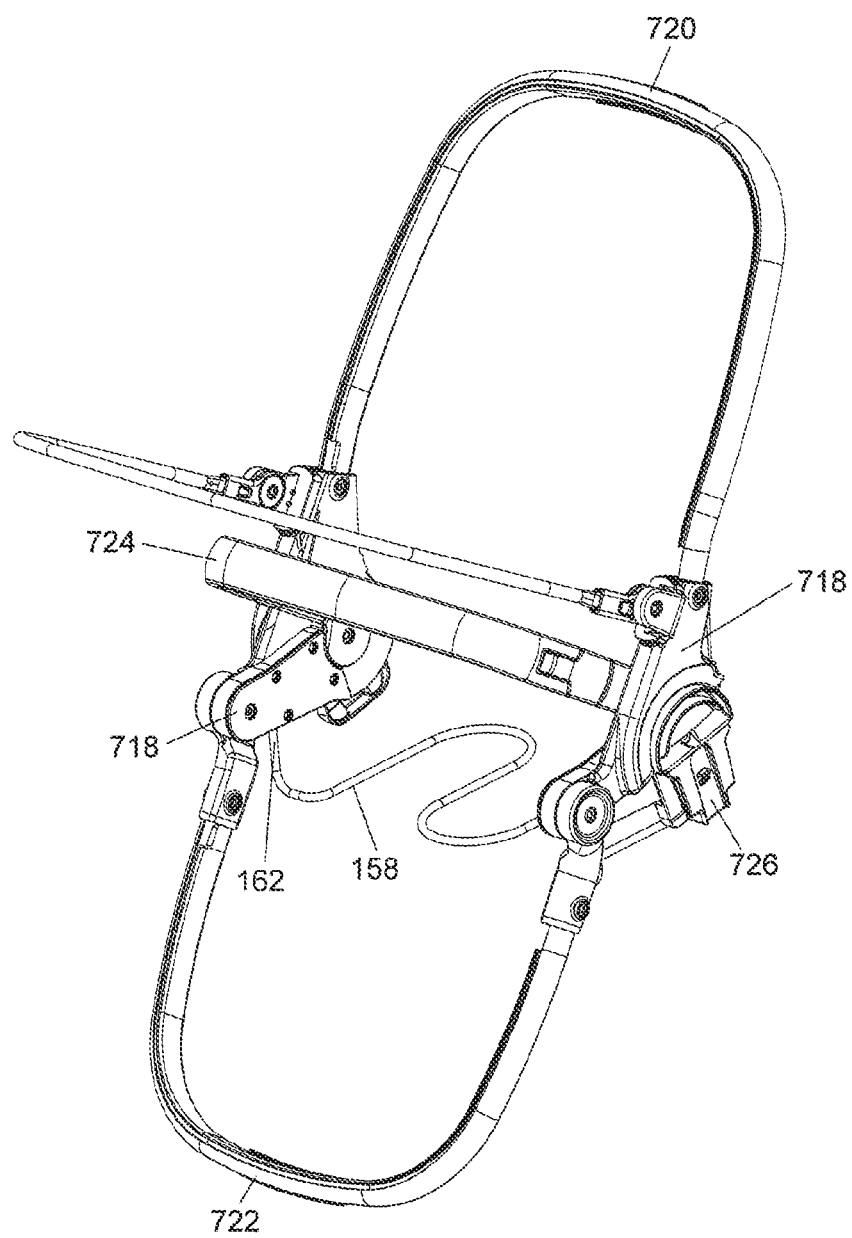

The juvenile support assembly 706 is provided as a removable unit that may be installed on and removed from two connecting mounts 716 provided on the child support apparatus 700, the two connecting mounts 716 being exemplary affixed with the two side portions 704A of the handle frame 704. FIG. 19 is a perspective view illustrating the juvenile support assembly 706 alone. Referring to FIGS. 18 and 19, the juvenile support assembly 706 can include two side coupling parts 718 respectively disposed at the left and right sides of the juvenile support assembly 706, two frame portions 720 and 722 and a guard member 724. Each of the two frame portions 720 and 722 can have a U-shape, and can be respectively connected with the two side coupling parts 718. The guard member 724 can also have a U-shape with two ends thereof respectively connected with the two side coupling parts 718. Each side coupling part 718 can have a connector 726 operable to engage with one connecting mount 716 provided on the child support apparatus 700. When the juvenile support assembly 706 is installed on the child support apparatus 700, the connectors 726 on the two side coupling parts 718 can respectively engage and lock with the two connecting mounts 716 provided on the child support apparatus 700.

Referring to FIGS. 18 and 19, the resilient wire 158 can be disposed below the guard member 724 with the two ends 162 of the resilient wire 158 respectively attached fixedly to the two side coupling parts 718. While the resilient 158 is shown as having a specific shape in FIGS. 18 and 19, it will be appreciated that any shapes described herein may be suitable. Moreover, a fabric (not shown for clarity) may be provided to cover at least partially the resilient wire 158, like described previously.

Advantages of the child support apparatuses described herein include a juvenile support assembly that has a resilient wire capable of elastic deformation to dissipate vibration and/or shock energy. Accordingly, the child support apparatus can offer a more comfortable support for the child during use.

Realizations of the child support apparatus have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child support apparatus comprising:
a standing frame;
a juvenile support assembly supported on the standing frame, wherein the juvenile support assembly has a left and a right side and includes a resilient wire extending between the left and right sides, the resilient wire forming a bearing support for a child that is elastically deformable along an upward-downward direction of the juvenile support assembly; and
two side bar portions respectively disposed at the left and right sides of the juvenile support assembly, wherein the standing frame includes a first and a second leg frame connected with each other so that the first and second leg frames are rotatable relative to each other during folding and unfolding of the child support apparatus, each of the two side bar portions being connected with the standing frame, and the resilient wire having two opposite ends respectively attached to the two side bar portions, the resilient wire extending above the two side bar portions.

2. The child support apparatus according to claim 1, wherein the juvenile support assembly further includes a fabric that covers the resilient wire.

3. The child support apparatus according to claim 1, wherein the resilient wire includes a plurality of bent portions between the two opposite ends, the bent portions respectively forming a plurality of hinges allowing elastic deflection of the resilient wire along the upward-downward direction.

4. The child support apparatus according to claim 1, wherein the resilient wire is bent to form a wave shape that stretches back and forth between a front and a rear end of the juvenile support assembly.

5. The child support apparatus according to claim 1, wherein the resilient wire is bent into a shape including a plurality of first and second sections, the first sections extending generally parallel to one another along a lengthwise axis of the juvenile support assembly and the second sections extending generally parallel to one another along a transversal axis of the juvenile support assembly, the lengthwise axis extending from a front to a rear of the juvenile support assembly and the transversal axis extending from the left to the right side of the juvenile support assembly.

6. The child support apparatus according to claim 1, wherein the resilient wire is bent to form a spiral shape.

7. The child support apparatus according to claim 1, wherein the resilient wire is made of steel.

8. The child support apparatus according to claim 1, wherein the two side bar portions are respectively connected pivotally with at least one of the first and second leg frames.

9. The child support apparatus according to claim 1, wherein the two side bar portions are respectively connected pivotally with a transversal portion, the transversal portion being positionable to extend in front of the resilient wire.

10. The child support apparatus according to claim 1, wherein the child support apparatus further includes a handle frame that is pivotally coupled to the standing frame, and each of the two side bar portions is respectively linked to the handle frame and the standing frame.

11. The child support apparatus according to claim 10, wherein the handle frame, the first and second leg frames are pivotally connected with one another about a common pivot axis.

12. The child support apparatus according to claim 10, wherein the two side bar portions are respectively linked to the handle frame via two linking bars, each linking bar having two ends respectively connected pivotally with one side bar portion and the handle frame.

13. The child support apparatus according to claim 1, further comprising a guard member extending above the resilient wire, the guard member being configured to restrict a child sitting on the juvenile support assembly.

14. The child support apparatus according to claim 1, being implemented as a child stroller apparatus.

15. A child support apparatus comprising:
a standing frame; and
a juvenile support assembly supported on the standing frame, wherein the juvenile support assembly has a left and a right side and includes a resilient wire extending between the left and right sides, the resilient wire forming a bearing support for a child that is elastically deformable along an upward-downward direction of the juvenile support assembly;
wherein the standing frame includes a first and a second leg frame connected with each other so that the first and second leg frames are rotatable relative to each other during folding and unfolding of the child support apparatus, and the resilient wire includes two opposite ends respectively attached fixedly to the first leg frame at the left and right sides of the juvenile support assembly, each of the two opposite ends of the resilient wire being respectively attached to a wire anchoring part that is fixedly connected with the first leg frame.

16. The child support apparatus according to claim 15, wherein the juvenile support assembly further includes a fabric that covers the resilient wire.

17. The child support apparatus according to claim 15, wherein the resilient wire includes a plurality of bent portions between the two opposite ends, the bent portions respectively forming a plurality of hinges allowing elastic deflection of the resilient wire along the upward-downward direction.

18. The child support apparatus according to claim 15, wherein the resilient wire is bent to form a wave shape that stretches back and forth between a front and a rear end of the juvenile support assembly.

19. A child support apparatus comprising:
a standing frame; and
a juvenile support assembly supported on the standing frame, wherein the juvenile support assembly has a left and a right side and includes a resilient wire extending between the left and right sides, the resilient wire forming a bearing support for a child that is elastically deformable along an upward-downward direction of the juvenile support assembly;
wherein the standing frame further includes a first and a second leg frame, and the juvenile support assembly further includes a seat board that is respectively coupled to the first leg frame via a pivot connection and to the second leg frame via a linking bar portion, the resilient wire being disposed above the seat board.

20. The child support apparatus according to claim 19, wherein the juvenile support assembly further includes a fabric that covers the resilient wire.

21. The child support apparatus according to claim 19, wherein the resilient wire includes two opposite ends respectively anchored at the left and right sides of the juvenile support assembly, and a plurality of bent portions between the two opposite ends, the bent portions respectively forming a plurality of hinges allowing elastic deflection of the resilient wire along the upward-downward direction.

22. The child support apparatus according to claim 19, wherein the resilient wire is bent to form a wave shape that stretches back and forth between a front and a rear end of the juvenile support assembly.

23. The child support apparatus according to claim 19, wherein the resilient wire is bent into a shape including a plurality of first and second sections, the first sections extending generally parallel to one another along a lengthwise axis of the juvenile support assembly and the second sections extending generally parallel to one another along a transversal axis of the juvenile support assembly, the lengthwise axis extending from a front to a rear of the juvenile support assembly and the transversal axis extending from the left to the right side of the juvenile support assembly.

24. The child support apparatus according to claim 19, wherein the resilient wire is bent to form a spiral shape.

25. A child support apparatus comprising:
a standing frame;
a handle frame connected with the standing frame;
two connecting mounts provided on the handle frame; and
a juvenile support assembly installable on and removable from the two connecting mounts, wherein the juvenile support assembly includes two side coupling parts respectively disposed at a left and a right side of the juvenile support assembly, and a resilient wire extending between the left and right sides and having two opposite ends respectively attached fixedly to the two side coupling parts, each of the two side coupling parts having a connector operable to engage with one connecting mount, and the resilient wire forming a bearing support for a child that is elastically deformable along an upward-downward direction of the juvenile support assembly.

26. The child support apparatus according to claim 25, wherein the juvenile support assembly further includes a fabric that covers the resilient wire.

27. The child support apparatus according to claim 25, wherein the resilient wire includes a plurality of bent portions between the two opposite ends, the bent portions respectively forming a plurality of hinges allowing elastic deflection of the resilient wire along the upward-downward direction.

28. The child support apparatus according to claim 25, wherein the resilient wire is bent to form a wave shape that stretches back and forth between a front and a rear end of the juvenile support assembly.

* * * * *